United States Patent [19]

Desir, Sr.

[11] Patent Number: 5,032,444
[45] Date of Patent: Jul. 16, 1991

[54] REVEAL MOLDING

[75] Inventor: Julio Desir, Sr., Inkster, Mich.

[73] Assignee: The Standard Products Company, Cleveland, Ohio

[21] Appl. No.: 495,481

[22] Filed: Mar. 19, 1990

[51] Int. Cl.$^5$ ............................................. B60R 13/06
[52] U.S. Cl. .................................. 428/122; 49/490; 52/716; 296/93; 428/358
[58] Field of Search ............... 428/31, 122, 120, 358; 49/490; 52/399, 716; 296/93

[56]  References Cited

U.S. PATENT DOCUMENTS

| 4,248,933 | 2/1981 | Katoh | 428/122 X |
| 4,708,895 | 11/1987 | Mizusawa | 428/31 |
| 4,813,733 | 3/1989 | Gustafson et al. | 428/122 X |
| 4,880,674 | 11/1989 | Shimizu | 482/122 X |
| 4,953,907 | 9/1990 | Sugita | 296/93 |
| 4,963,403 | 10/1990 | Roberts et al. | 428/31 |

FOREIGN PATENT DOCUMENTS 1214057 12/1970 United Kingdom ................... 428/31

Primary Examiner—Henry F. Epstein
Attorney, Agent, or Firm—Harness, Dickey & Pierce

[57] ABSTRACT

A glass reveal molding has a generally J-shaped clamping portion which exerts substantially even gripping pressures on both the top and bottom surfaces of the glass. The molding utilizes a more rigid carrier on the clamping portion and a softer, more flexible material on the crown portion. The molding substantially eliminates roll-over or disengagement of the molding to the glass prior to complete assembly. The molding also provides a crown which covers the gap between the vehicle body contour and the glass perimeter.

7 Claims, 1 Drawing Sheet

REVEAL MOLDING

BACKGROUND AND SUMMARY OF THE INVENTION

The present invention relates generally to edge molding for window panels or the like. More particularly, the present invention relates to a molding for a fixed window of an automobile vehicle such as a windshield or backlite. The molding bridges space between the edge of the glass panel and the adjacent body panel.

Automotive windshields and backlites are commonly mounted to the associated vehicle body in a manner which leaves a space between the periphery of the glass panel and the body panel. This space is covered by molding, referred to as a windshield or backlite reveal molding. In covering the space between the glass panel and vehicle body, the reveal molding serves to improve the visual appearance of the automotive vehicle and to reduce wind noise.

To present the best visual appearance, reveal moldings must extend evenly around the space between the glass panel and body panel and must be able to accommodate spaces having varying widths. Reveal molding should also be able to curve around the radius of the glass panel without detaching from the edge of the panel or twisting to become disengaged from the glass panel or body panel. Reveal molding also should resist fluttering in the relative wind.

Many moldings designed for attachment to the edge of automotive glass are of a single, asymmetrical construction. When such moldings are attached around the radius of a glass panel edge the clamping pressure of the two opposing molding surfaces is uneven due to the difference of resistance between the mass of material above and below the center axis of glass. This difference in resistance can cause gapping of one gripper or the other resulting in a loss of uniform gripping about the radius. Loss of gripping can result in detachment of the molding from the glass edge and a rolling of the molding away from the surface of the glass or from the surface of the vehicle body. This result is unsightly and defeats the cosmetic function of the molding as well as increasing the possibility of the molding becoming snagged and pulled out.

One patent which overcomes the above shortcomings is U.S. Pat. No. 4,813,733, assigned to the assignee of the present application, the specification of which is herein incorporated by reference. While this device functions satisfactorily, designers strive to improve the art.

In accordance with the present invention, a glass reveal molding has a generally J-shaped clamping portion which exerts substantially even gripping pressure on both the top and bottom surfaces of the glass panel. The equalizing pressure of the clamping portion will substantially eliminate gapping around the radius and retains the molding on the windshield without gapping or rolling of the molding. The molding also has a crown which covers the head of the "J" clamping portion. The crown enables the molding to cover the gap between the windshield and the body panel. Further, the clamping portion and crown portion are of different materials such that the clamping portion is more rigid than the crown to provide desired characteristics.

A further understanding of the present invention will be had from the following description of the preferred embodiments taken in conjunction with the attached drawings and appended claims.

DETAILED DESCRIPTION OF THE PREFERRED EMBODIMENT

Figure 1:
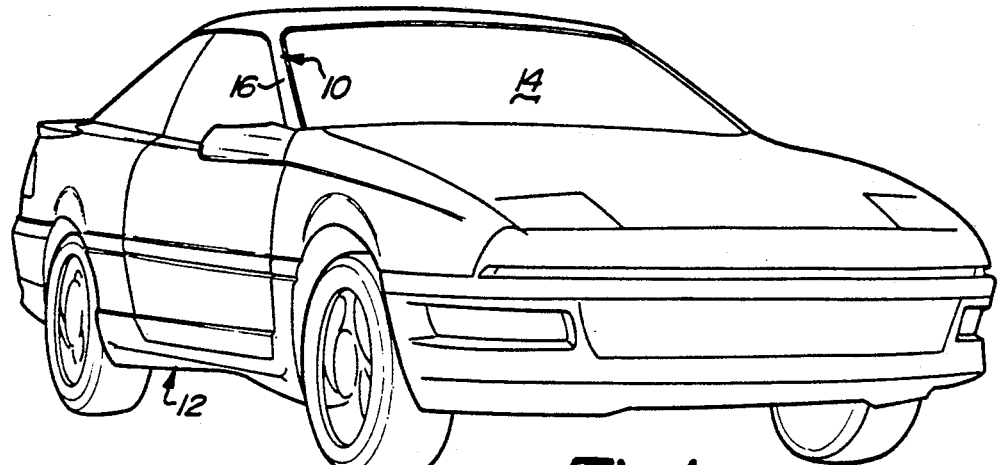
FIG. 1 is a perspective view illustrating a reveal molding of the present invention in place about the periphery of a windshield of an automotive vehicle.
Figure 2:
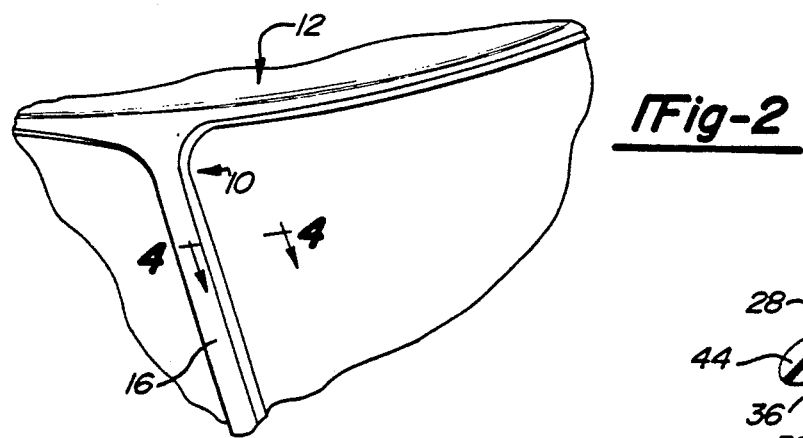
FIG. 2 is an enlarged view of the reveal molding of FIG. 1.
Figure 3:
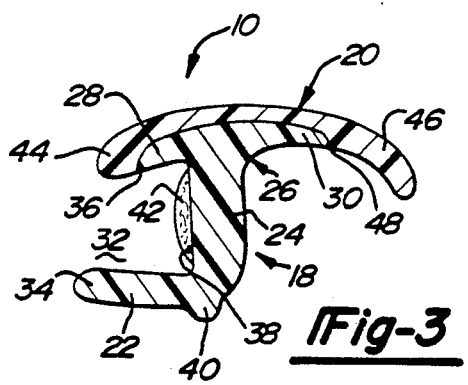
FIG. 3 is a cross-section view of the reveal molding in a relaxed condition.

Referring to FIGS. 1 and 2, a preferred embodiment of a hug-on glass molding of the present invention is illustrated and indicated generally by the reference numeral 10. FIG. 1 illustrates hug-on glass molding 10 in operative association with an automobile 12 as a windshield reveal molding. As shown in FIG. 2, the hug-on glass molding 10 extends around the sides and top of a windshield 14 to cover the space between a conventionally installed windshield 14 and a body panel 16 of the automobile 12. It will, of course, be appreciated by those skilled in the art that hug-on glass molding 10 is well suited for use as an automotive windshield reveal molding or backlite reveal molding but also has molding uses both inside and outside the automotive field.

Hug-on glass molding 10 is comprised of a suitable elastic material and is an elongated molding broadly comprising, in cross-section, a J-shaped clamping portion 18 and a crown 20, both of which may be comprised of a polyvinyl chloride or other suitable elastomeric material as is common in the art. Ordinarily, the J-shaped clamping portion 18 is formed of a generally rigid polyvinyl chloride and the crown 20 is formed of a softer, more flexible polyvinyl chloride material.

The polyvinyl chloride utilized for the clamping portion 18 should provide adequate strength to the molding. Also, it should accentuate the molding's ability to firmly hold onto the glass and should be less susceptible to react to various weather conditions. The softer crown 20 provides the flexibility needed for spanning the gap between the glass panel and the body member and contacting the body member. As will be explained herein, the flexibility is controlled by the extension of the crown beyond the sealing point of the more rigid clamping portion 18.

It will be understood that the durometer of the plastic for the J-shaped clamping portion 18 is selected to provide and assure a desired level of rigidity and interference fit and attachment to the molding with the window panel. The durometer of the crown 20 is selected to provide and assure a desired level of flexibility and resilience for yieldable sealing contact between the crown 20 and window panel 14 and the body panel 16. Ordinarily, the clamping portion 18 and crown 20 are to be co-extruded and are comprised of polyvinyl chloride of a hardness of durometer, shore A 93-97 instantaneous and shore A 80-85 instantaneous, respectively.

The J-shaped clamping portion 18 includes a leg 22, body 24 and head 26. The head 26 is divided into a front half 28 and rear half 30 by the body 24 with the rear half 30 being longer than the front half 28. The leg 22, body 24 and front half 28 of head 26 form a channel 32 which receives the glass panel 14. The leg 22, in a relaxed position, is substantially transverse to the body 24 having its outward free end 34 curling slightly inward into the channel 32. Head front half 28 and rear half 30, in a relaxed position, both arcuately extend from the body 24. The head front half 28 has its free end 36 extending inwardly into the channel 32. The leg 22 is longer than head front half 28 and generally extends a distance further away from the body 24. The leg 22 extends a distance from the surface 38 which is ordinarily greater than the width of the glass panel 14. This length may be as little as 0.5 millimeters longer than the specified glass thickness to prevent roll-over of the molding. The body 24 has a substantially planar interior surface 38 which defines the web of the U-shaped channel 32. The surface 38 has a span between the leg 22 and head front half 28 which defines the maximum width of a glass panel which may be accepted by the clamping member 18. Also, the inward ends 34 and 36 define a minimum span between the leg 22 and front half 28 for accepting the minimum width of a glass panel.

The J-shaped clamping portion 18 includes a bottom nib 40. The bottom nib 40 enables an adhesive to flow around the nib 40 to mechanically lock the hug-on glass molding 10 in place with respect to the vehicle body 16 when the adhesive hardens.

Also, a heat activated adhesive 42 may be positioned into the channel 32, ordinarily on surface 38, for retention of the hug-on glass molding 10 on the edge of the windshield 14 during subassembly. The heat activated adhesive holds the hug-on molding 10 in place until final assembly on the vehicle.

The crown 20 provides an umbrella-shaped cover which extends across the space between the windshield 14 and the adjacent vehicle body 16. The crown 18 must be resilient and flexible so as to maintain an overlying engagement with the associated vehicle body which may not always be in exact alignment. The crown 20 includes a head portion 44 and a tail portion 46. The head portion 44 covers the head front half 28 of the clamping member 18.

The head portion 44 along with the head front half 28 is of a substantially equal amount of mass as the leg 22 so that an equal amount of mass is above and below the central plane of the glass windshield 14. This allows for even clamping pressure on the opposite surfaces of the glass portion. This equalized pressure or force of the clamping member reduces the problem of gapping and twisting around the radius of the windshield and enhances retention of the molding on the windshield without rolling or gapping of the molding. Thus, problems with respect to detachment of the molding from the glass edge or a rolling of the molding away from the glass edge are minimized.

Figure 4:
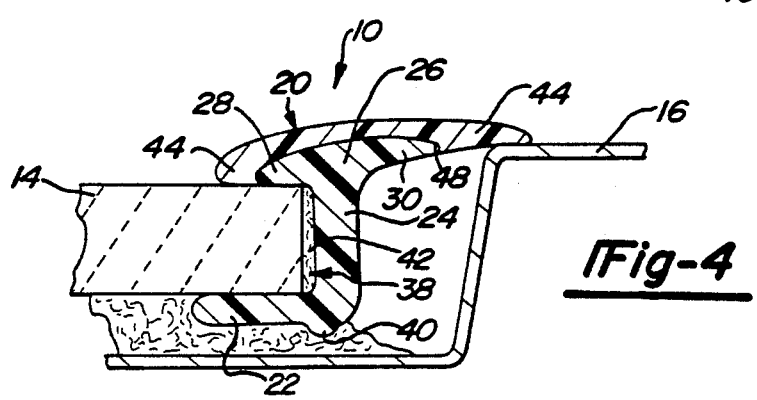
FIG. 4 is a cross-section view, taken along Line 4—4 of FIG. 2 thereof.

The tail 46 is substantially flexible to contact the vehicle body 16. The flexibility is controlled by the extension of the tail 46 beyond the sealing point 48 of the tail 46 with the head rear half 30. When hug-on molding 10 is installed, as seen in FIG. 4, the head rear half 30 and tail 46 are straightened and extended from their relaxed arcuate position. Due to the desire of the more rigid straightened head rear half 30 to return to its relaxed arcuate position, the head rear half 30 generates a downward force in the head rear half 30 to pull the tail 46 downward which, in turn, causes the tail 46 to engage in sealing contact with the vehicle body 16, as seen in FIG. 4.

The hug-on molding 10 is well adapted to be a windshield reveal molding. Hug-on molding 10 can accommodate uneven edges of glass without becoming twisted or otherwise disengaged. Furthermore, hug-on molding 10 can be easily installed and is stable once installed to resist disengagement due to temperature extremes, wind or the like. Clamping portion 18 uniformly engages the glass panel edge while crown 20 uniformly covers the space between the glass panel edge and the body panel edge.

While the above description sets forth the preferred embodiment of the present invention, it will be apparent to those skilled in the art that the present invention is subject to modification and variation within the scope and spirit of the following claims.

What is claimed is:

1. A molding comprising:
   an elastic clamping member having in cross section an overall "J" shape with a leg, body and head, said head being divided by said body into a front and rear half such that said leg, body and front half of said had define a channel for receiving a panel edge; and
   an elastic crown coupled with said head and extending beyond said head front and rear halves, a portion of the crown over the head front half and said head front half having a mass substantially equal to mass of said leg for providing even clamping pressure on opposite surfaces of a panel placed in said channel, wherein the clamping member and crown are unitarily formed and said clamping member is formed of a material more rigid than said crown.

2. The molding according to claim 1 further comprising an adhesive means for securing said clamping member with the panel edge, said adhesive means coupled with said clamping member.

3. The molding according to claim 1 wherein said leg extends substantially perpendicular and has an arcuate tip.

4. The molding according to claim 1 wherein said head front half arcuately extends from said body toward said leg.

5. The molding according to claim 1 wherein said clamping member has a shore A hardness of between 93 and 97 instantaneous and said crown has a shore A hardness of between 80 to 85 instantaneous.

6. The molding according to claim 1 wherein said leg extends a longer distance away from said body than head front half.

7. The molding according to claim 1 wherein said leg is longer than a distance between said head front half and said leg.

* * * * *

UNITED STATES PATENT AND TRADEMARK OFFICE
CERTIFICATE OF CORRECTION

PATENT NO. : 5,032,444
DATED : July 16, 1991
INVENTOR(S) : Julio Desir, Sr.

It is certified that error appears in the above-identified patent and that said Letters Patent is hereby corrected as shown below:

Column 4, line 29, "had" should be --head--

Column 4, line 37, "the" should be --said--

Signed and Sealed this

Eleventh Day of May, 1993

Attest:

MICHAEL K. KIRK

*Attesting Officer*   *Acting Commissioner of Patents and Trademarks*